(12) United States Patent
Constantinou et al.

(10) Patent No.: US 7,370,367 B2
(45) Date of Patent: May 6, 2008

(54) SECURITY DEVICE AND ARTICLE INCORPORATING SAME

(75) Inventors: Andreas Sotiriou Constantinou, Knowle (GB); Marios Panikos Sotiriou, Knowle (GB); Guy Davies, Stratford-Upon-Avon (GB)

(73) Assignee: 3Lfants Limited, Solihull (GB)

( * ) Notice: Subject to any disclaimer, the term of this patent is extended or adjusted under 35 U.S.C. 154(b) by 681 days.

(21) Appl. No.: 10/276,516

(22) PCT Filed: May 18, 2001

(86) PCT No.: PCT/GB01/02261

§ 371 (c)(1),
(2), (4) Date: Apr. 1, 2003

(87) PCT Pub. No.: WO01/88921

PCT Pub. Date: Nov. 22, 2001

(65) Prior Publication Data

US 2003/0174616 A1    Sep. 18, 2003

(30) Foreign Application Priority Data

May 18, 2000   (GB) ................................. 0011904.0
Oct. 11, 2000  (GB) ................................. 0024859.1

(51) Int. Cl.
*G06F 7/04*     (2006.01)
*G06F 17/30*    (2006.01)
*G11B 19/04*    (2006.01)
*G11B 27/36*    (2006.01)

(52) U.S. Cl. ................ 726/28; 380/201; 380/203; 369/53.21; 369/273; 369/275.3; 369/275.4; 369/275.5

(58) Field of Classification Search .............. None
See application file for complete search history.

(56) References Cited

U.S. PATENT DOCUMENTS

| | | | | |
|---|---|---|---|---|
| 5,662,838 A | * | 9/1997 | Yamaguchi et al. | 261/130 |
| 6,338,933 B1 | * | 1/2002 | Lawandy et al. | 430/270.1 |
| 6,343,063 B1 | * | 1/2002 | Rollhaus et al. | 369/286 |
| 6,510,118 B1 | * | 1/2003 | Morikawa | 369/84 |
| 6,636,689 B1 | * | 10/2003 | Stebbings | 386/94 |

* cited by examiner

*Primary Examiner*—Ayaz Sheikh
*Assistant Examiner*—Trang Doan
(74) *Attorney, Agent, or Firm*—James P. Hanrath

(57) ABSTRACT

A compact disc (10) for a computer incorporates a security device for preventing non-authorized reading of data carried by the disc. The security device includes an LCD laser blocker (16) which is activated or deactivated by means of a microchip (13) powered by a cell (14) and/or solar panel (15). Authorized reading of the data is possible by a fingerprint scanner (12) linked to the microchip and causing it to deactivate the blocker (16), when the scanner recognizes a user's fingerprint which the microchip matches to a programmed authorized fingerprint. Also disclosed is a data carrying compact disc (20) which incorporates security means to allow a first reading of the data of the disc, but to prevent such reading thereafter. An area (21) of the disc, such as a FAT file, can be arranged to be destroyed or blocked, to prevent subsequent reading thereof by the disc reading means.

7 Claims, 3 Drawing Sheets

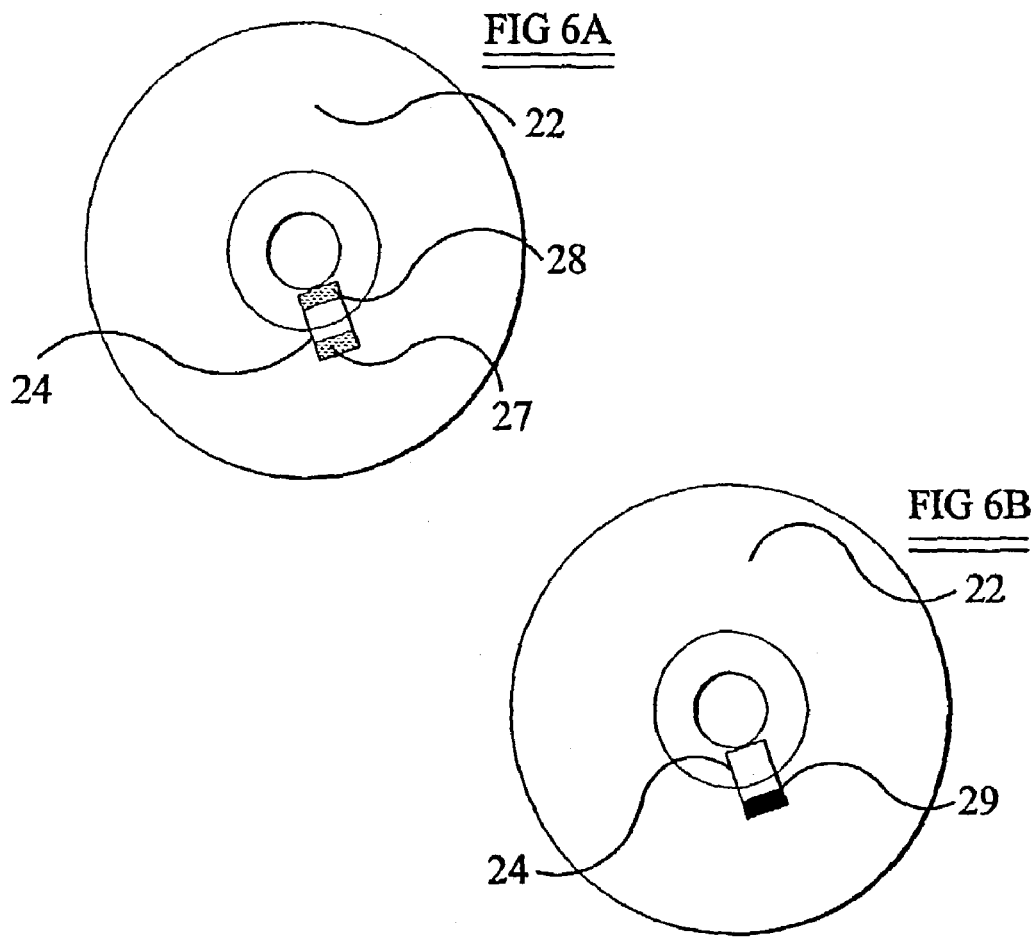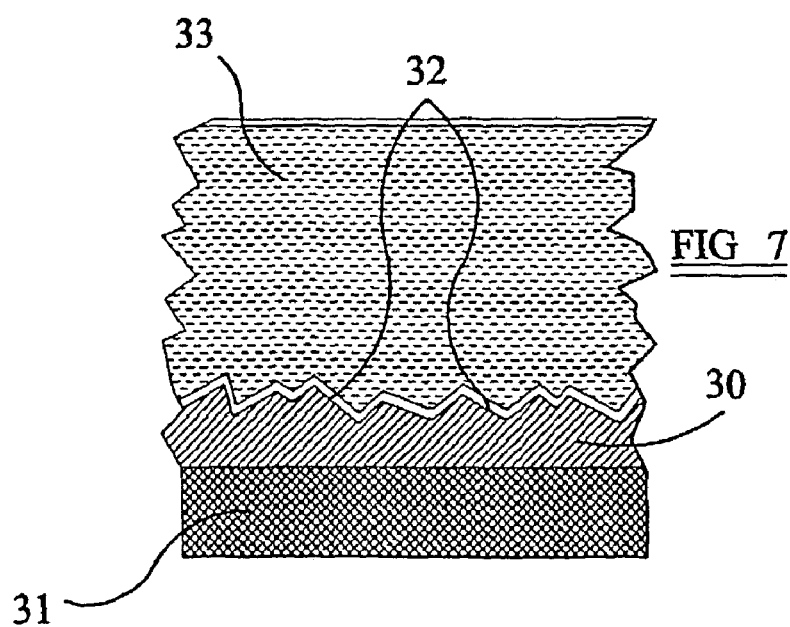

SECURITY DEVICE AND ARTICLE INCORPORATING SAME

This invention relates to a security device and also to an article incorporating same, and has particular application to compact discs. An object of the invention is to provide such a security device in an effective and convenient form.

According to a first aspect of the invention there is provided a disc or like article intended to be rotatable by drive means, in use, the disc or like article incorporating a security device comprising reading prevention means for preventing reading of information/data stored on/carried by the disc or like article, and release means for overcoming/deactivating said reading prevention means.

Desirably the security device includes electronic means, and conveniently, in use, said release means recognise a programmed human physical characteristic of an authorised person, such as a fingerprint or voice.

In another aspect of the invention there is provided a security device for a disc or like article intended to be rotatable by drive means, in use, the security device comprising means for preventing reading of information/data stored on/carried by the disc or like article with which the security device is intended to be associated, in use, and release means for overcoming/deactivating said reading prevention means.

According to a second aspect of the invention there is provided a data/information carrying disc or like article intended to be rotatable by drive means, in use, the disc or like article incorporating security means allowing data/information to be read when the disc or like article is used for the first time, but preventing such reading after said first time.

The invention also relates to said security means per se.

Figure 1:
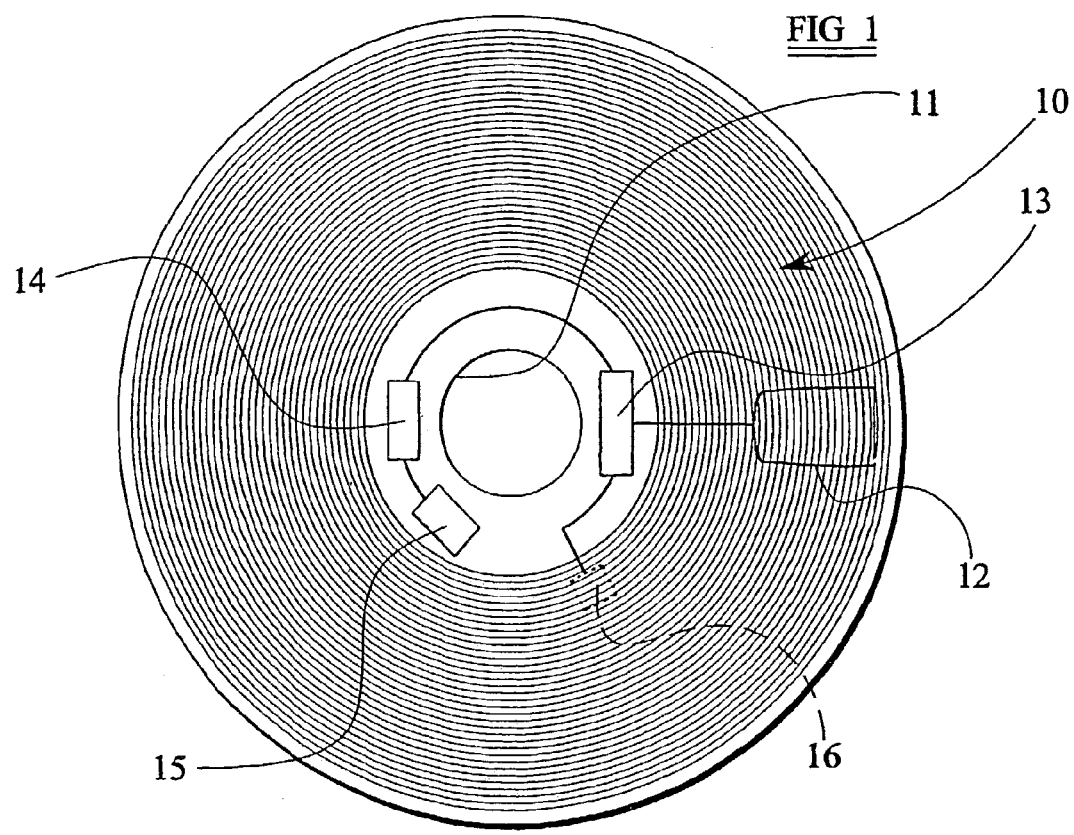
Figure 2:
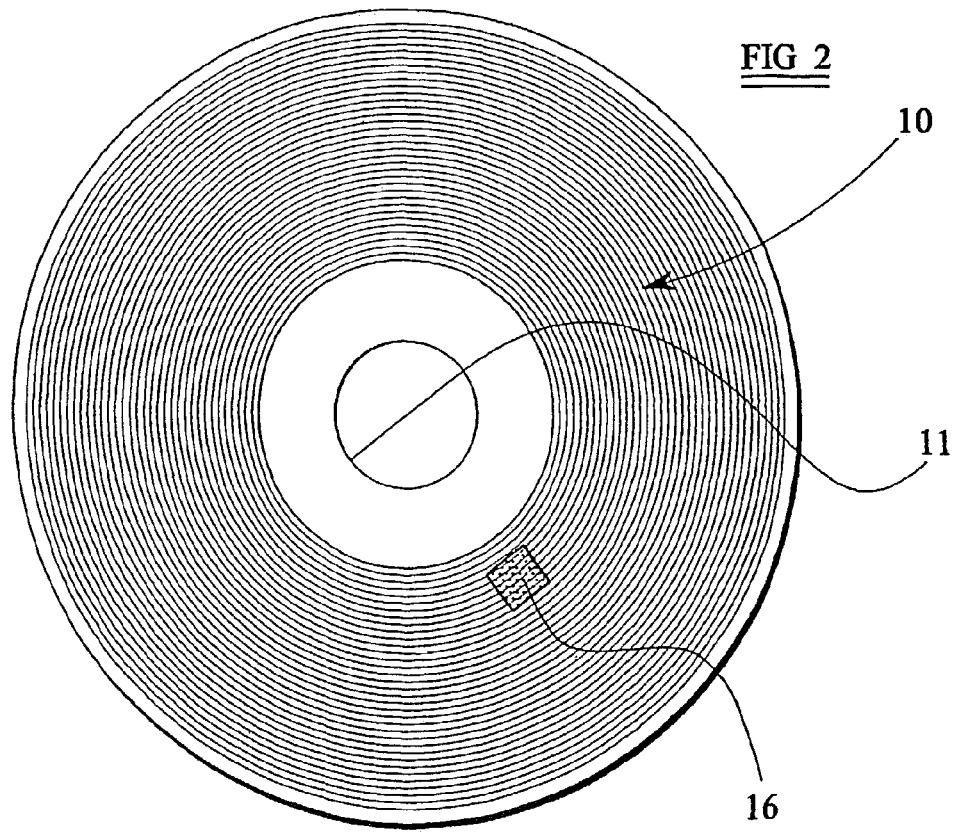
Figure 3:
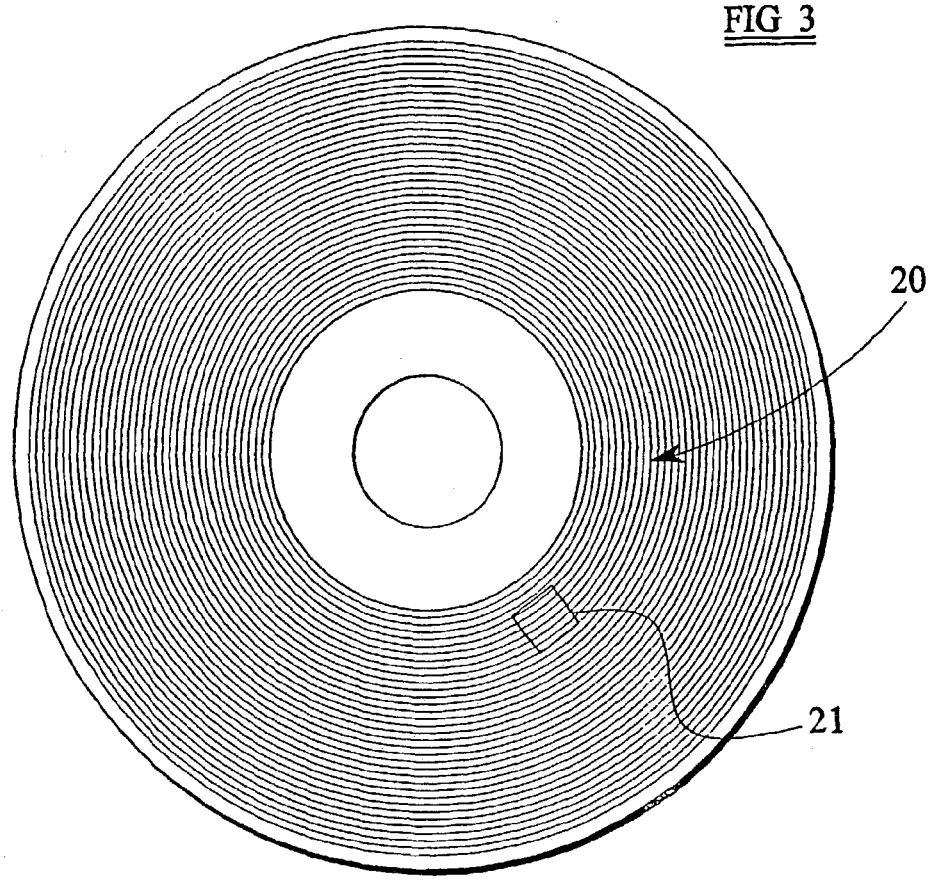
Figure 4:
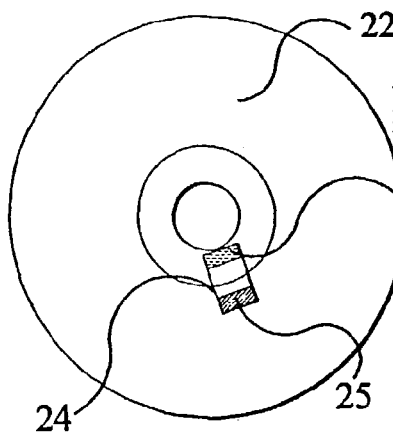

The invention will now be described with reference to the accompanying drawings, in which:

FIG. 1 is a view of one side of a disc according to said first aspect of the invention, FIG. 2 is a view of the opposite side of the disc of FIG. 1, FIG. 3 is a view of one side of a disc according to said second aspect of the invention, FIG. 4 is a view of one side of a disc according to another embodiment of said second aspect, FIG. 5A, FIG. 5B, and FIGS. 6A and 6B, are schematic views, like FIG. 4, of three further embodiments of said second aspect respectively, and FIG. 7 is a schematic scrap sectional view of a disc of a still further embodiment of said second embodiment.

One embodiment of a security device according to said first aspect of the present invention is shown in FIGS. 1 and 2. Whilst this security device can be used with any of the indication devices and/or verification devices described and/or illustrated in our International Application No. PCT/GB01/01099, its function differs, in that it is an information/data lock which makes it impossible for the information/data carried by the article, e.g. a disc, to be read, except by an authorised person.

Whilst it is possible that the security device could be of a form which prevents release of information/data by preventing rotation of the disc, this is not essential as instead the security device can be such as to prevent information/data being read/released from the disc even when it rotates, with an authorised person, in either case, being able to overcome the 'lock' on the release of said information/data.

Alternatively the security device could be incorporated with a disc such that normally it is 'de-coupled' from the disc, so that in this state the device would rotate, in use, without the disc. An authorised person can, however, overcome the rotation preventing means, i.e. the de-coupling of the disc from the security device, by operating the release means of the device, so that, in use, the disc is coupled to, and thus rotates with, the device.

The security device, which is incorporated in the CD or other rotational article in use, may comprise a minute 'brain', possibly a microchip, which may possibly have its own (small) power source. Alternatively power could be drawn from human touch or some other source. The 'brain' would be programmable with, for example, a unique individual human physical characteristic, such as one or more fingerprints or a palm print, of an authorised user and be able to recognise it. Alternatively the 'brain' could be voice activated. The recognition of an authorised user would be required each time the disc is to be used. The security device could preferably 're-set' automatically after each use. Alternatively the user could effect the resetting by fingerprint recognition at the end of the user's reading of the disc.

If a fingerprint recognition system is used, there would be a fingerprint size window (or other type of sensor) on the surface of the CD (could be LCD). This would be clearly marked. Normally the security device would be in an 'activated' state, i.e., one in which rotation of the CD as a whole, or the disc separated from the security device, is prevented, or one in which reading of the information/data stored on the disc is prevented. On presentation of the 'correct' fingerprint etc., to the window, the 'brain' would recognise it and deactivate the 'lock' against rotation or against information/data reading, thereby allowing the CD to be read in the normal manner, i.e. it would unlock the information/data. This is another task the 'brain' may have to perform, apart from the recognition aspect. This may involve some programming or even one or more additional components. The same principals may be applied in a manner which enables the device to recognise voice/sound.

FIGS. 1 and 2 show a specific embodiment of the first aspect of the invention in which a data carrying disc 10 incorporates a security device which prevents a laser of the read/drive means of a computer, or other disc drive means, reading the data carried by or stored on the disc as the disc rotates.

The disc 10 has a conventional central hole 11 around which can be an arcuate recess to accommodate at least part of the security device. However the security device can be carried by/incorporated into the disc in any other convenient manner, e.g. by being sandwiched between layers of the disc. Towards the outer periphery of the disc, on the surface thereof shown in FIG. 1, is a fingerprint scanner 12. This is electrically connected in any suitable manner, such as by way of the 'wiring' on a conventional PCB, to a microchip 13 fixed in the recess. The microchip can be a proprietary item or can item specifically designed for the subject application. Suitably connected to the microchip. 13 is a power source, such as a power cell 14, which could be optionally connected to a solar panel or cell 15. Alternatively the solar panel 15 could be the sole power source. The cell could be rechargeable.

The disc has on its opposite side, as shown in FIG. 2, a FAT file (File Allocation Table or Data Index) which is arranged to be covered by an LCD laser blocker 16. The laser blocker is connected to the microchip 13 which controls its state, i.e. activated or de-activated. For example the microchip could be programmed so that before the disc is used for the first time, the laser blocker is activated, as shown dark in FIG. 2, until a correct (matching) fingerprint at the scanner 12 is confirmed as a positive match by the microchip 13, which then de-activates (switches off) the blocker 16. Accordingly on rotating the disc the laser light of the reading device (computer) passes through the blocker to access the FAT file and read the data on the disc in the normal manner. At the end of the reading of the disc, the microchip could be arranged then to re-activate the blocker 16, so that a correct fingerprint verification is again required before the disc can subsequently be read. As indicated in the drawings, the FAT file is not visible from the side of the disc at which the fingerprint scanner is disposed.

In one alternative arrangement, the microchip could be programmed to recognise more than one person's fingerprint. Moreover in such a case, the programme could be arranged so that one such authorised person is allowed access to some of the data on the disc, whilst another such authorised person is allowed access to different data or more or less of said data accessible to said one such authorised person.

Instead of a fingerprint recognition system, any other suitable individual characteristic, such as voice activation, could be used.

This first aspect of the invention also relates to the security device per se.

A further aspect of the invention is concerned with the problem of global CD software piracy. Presently it is not possible for a CD software producer to ensure that only the customer who legally purchases software CD's actually uses them. It is commonly specified in Licence Agreements for software that an item of software is to be used by the purchaser only, and only on one personal computer. However there are presently, as stated above, no means of enforcing such Agreements, nor indeed of realistically enforcing piracy laws, and the loss to the software industry is believed to amount to billions of dollars. This further invention addresses this problem.

In essence, the solution is to provide a data/information carrying article, such as a CD, which 'destroys' itself as it is being read for the first time, or after completion of it being read for the first time.

In one embodiment the article, e.g. a software or other CD, such as a music CD or a DVD, is manufactured, at least partly, of laser light reactive material (substance/compound), possibly LCD or organic/biological matter. As such a CD is read for the first time, or on completion of it being read for the first time, it is effectively 'destroyed'. This would take the form of at least changing it in some manner which thereafter prevents the reading/retrieval of information/data from the disc. Generally the change would be such that said reading/retrieval is prevented at least by the laser light to which it was subjected during its first rotation. If this is considered insufficient, the change could be such as to prevent the reading/retrieval by any known reading means. The change could be triggered by operation of the disc eject button of the disc player.

The material could be added to the ingredients of the plastics compound or plastics/silicone mixture or other mixture from which the CD is manufactured. Alternatively it could be in the form of a separate component incorporated into the CD, for example the material could be in the form of a (thin) plate/disc or the like.

Accordingly this aspect allows reading/retrieval of data/information from the CD once only, the CD being then rendered useless, or at least useless in respect of retrieving/reading the data/information it previously carried. In the first reading the data/information can be downloaded onto the purchaser's computer hard drive, where it will be (permanently) locked. It will be impossible to copy the entire program again, either onto another computer hard drive or onto another CD. It may be necessary to link with the software producer's website to register/verify purchaser and P.C. details, and possibly to receive 'start-up program' for the downloaded software CD to activate.

FIG. 3 shows a specific embodiment of the second aspect of the invention in which the FAT file 21 of the disc 20 is rendered inoperative after the disc is read for the first time.

Thus, in use, the disc is spun and the reading means, for example a laser, of the reader operates to read the data stored on/carried by the disc. The programme of the disc downloads onto the hard drive, and on completion, the security means of the programme causes the laser to return to the FAT file and to remain thereat for a sufficient time, e.g. 2 minutes, so as to erase the FAT file, i.e. by burning it out and thus destroying it. The disc cannot thereafter thus again be read. The burning out could be triggered by the pressing of the eject button of the CD/DVD player, the software being used to command the laser. Alternatively it could be triggered by the end of the first playing of the disc.

It is to be noted that in the preferred embodiment the CD itself is not 'destroyed' in a visually noticeable manner. It simply loses its ability to release data therefrom. This is because the data index is destroyed, but in another embodiment it could be because the actual material which initially holds the data is destroyed.

If the power of a typical laser in a disc reader drive is insufficiently strong to destroy (or render useless) the disc (or the FAT file) after downloading the data on the disc, a minute magnifying glass could be integrated onto a relevant portion of the disc. This will magnify and increase the strength of the laser reader and enable it effectively to destroy an appropriate part of the disc to prevent it being re-used. Instead of a glass lens, the magnification, i.e. the intensification of the laser power, could be provided by means of a chemical, e.g. a layer of suitable liquid.

The embodiment of the second aspect of the invention shown in FIG. 4 is one in which the security means is activated by the actual spinning of the disc, i.e. by centrifugal force, and i applicable to any form of disc, including a DVD.

Thus the security means is activated in the same manner as the indication means disclosed in our previously mentioned International Application No. PCT/GB01/01099.

Generally on first play of the disc 22, the centrifugal force moves (clear) corrosive acetate type gel 23 or other suitable material from a non-active position to a position where it can melt/destroy grooves and/or bumps of the FAT file, or any data holding area or other appropriate area of the disc. For example the acid can move from an area holding no data, to the area of the FAT file. The acid eats into and destroys the data, thereby rendering the disc useless.

In a manner similar to an embodiment of the indication means disclosed in our above-mentioned International application, the disc would incorporate a radial hollow tube 24, within which the acid is held at a safe position until rotation of the disc commences. Under centrifugal force the barrier retaining the acid is released and the acid then moves bodily along the tube in an 'outwards' direction to an outer edge of the tube, which edge covers and allows communication with the FAT file 25. The acid then starts to destroy said file. Meanwhile the drive is still able to read the whole disc once, before the disc is rendered inoperative.

Figure 5A:
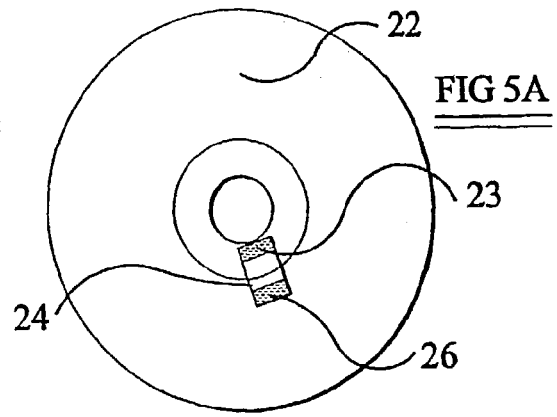
Figure 5B:
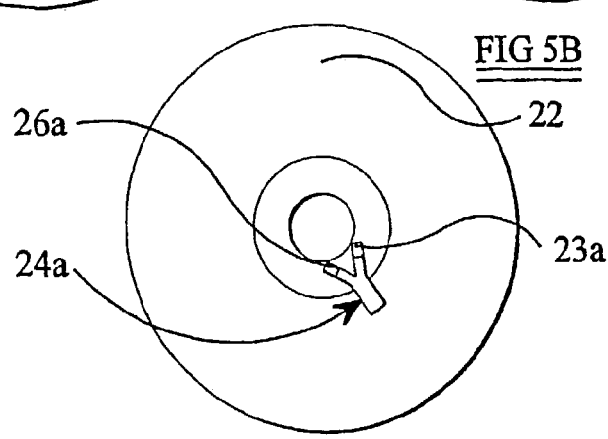

In an alternative embodiment, there could be two acids/other chemicals (e.g. 'harmless' to the FAT file) held in the cavity defined by the tube. One would be held at the inner end of the tube, i.e. adjacent the hub of the disc, whilst the other would be held at the outer end of the tube, where it is over, and able to communicate, with the FAT file. On disc rotation the barriers holding the acids/other chemicals are broken and the two acids/other chemicals mix to produce a compound, i.e. a 'harmful' acid, which chemically acts on the FAT file to destroy it, so that again the disc can only be read once. FIG. 5A is similar to FIG. 4, in showing disc 22, tube 24 and acid 23, but also shows the other acid 26 over the FAT file, both acids being held in place by respective barriers before the disc is spun. FIG. 5B shows an alternative where the two chemicals 23a, 26a are in the two arms of a Y-shaped 'tube' 24a. The chemicals move to react together when the disc is spun and form a 'harmful' acid as with the FIG. 5A embodiment, which destroys the FAT file at the outer end of the Y-shaped 'tube'.

In another alternative embodiment, shown in FIGS. 6A and 6B, a chemical 27, normally in liquid form, is disposed in the tube 24 over the area of the FAT file, with another chemical 28 disposed at the inner end of the tube. The chemical 27 is clear, i.e. transparent, so that laser light of the reader can pass through it and read the FAT file. However when the disc is spun, the centrifugal force causes the chemical 28 to move outwards, from its FIG. 6A position, through its broken retaining barrier to mix with the chemical 27 and to produce a dark coloured compound 29, shown in FIG. 6B, which covers and obscures the FAT file by the time the disc has been read for the first time. Thus the laser light reader can thereafter no longer pass through the dark compound and the disc can no longer be read. The same type of laser blocking affect could be produced by means of a (clear) liquid/gel held at the inner end of the tube and a clear plastics covering at the outer end, over the FAT file. Once the liquid/gel is moved along the tube by the centrifugal force of the spinning disc, it reacts with the plastics covering which then becomes sufficiently dark thereby to obscure the FAT file as described above, and makes the disc unreadable after said first time.

In another alternative embodiment both centrifugal force and the power of the laser are used to render the disc useless after its first playback. A radially positioned cavity/tube 30 (FIG. 7) has its inner end over the FAT file 31 and its outer end disposed outwardly therefrom towards the outer periphery of the disc. Inside the cavity, directly over the FAT file, the cavity is uneven, i.e. rough/jagged, as at 32, such that it disperses the laser light and prevents reading of the FAT file. However before the disc is read for its first and only time, the jagged area of the cavity has disposed thereat a transparent/clear liquid gel 33. The state of the gel is such that it counteracts the jagged laser light dispersing area of the cavity, so that with the gel in place, the laser light passes through the gel and jagged area to read the FAT file. The gel is sufficiently viscous to stay in this position during the first play of the disc, i.e. with a DVD, until the film has been watched or with a computer disc, until the program has loaded.

At the end of the first play pressing of the eject button of the disc reader/player, in one embodiment, causes software on the disc to command the player to execute two simple steps. Firstly the laser is caused to stay over the FAT file for a prolonged period which is sufficient to heat the gel and make it less viscous. Secondly, and preferably after the first step, the disc drive spins the disc at maximum RPM so as to cause the now less viscous gel to be moved outwardly along the tube 30 under centrifugal force, and thus away from the jagged area 32 over the FAT file. Accordingly the disc cannot again be read/played as the laser light cannot read the FAT file. Instead of the pressing of the eject button resulting in the player being commanded to carry out said steps, the termination of the first play of the disc could effect such command.

In a final alternative embodiment, a laser blocker such as an LCD (as in FIGS. 1 and 2) permanently blocks the FAT file from the laser light after the first play of the disc. Disc software is used to effect blocking.

In all the above embodiments, it could be any other area of the disc which is destroyed/cannot be read, rather than the FAT file, although use of the FAT file is the preferred area to prevent disc use after the first use.

Various ones of the embodiments in our earlier mentioned International Patent Application can be used with both aspects of this invention. As general nonexclusive specifications, as appropriate, the following is to be noted:

i) Devices and/or their components can be any material (solid/liquid/gas/plasma), shape, style, colour, shade of colour, transparent/clear.

ii) Devices may be triggered/actuated and/or powered/driven by centrifugal force, heat, magnetic force, electricity, laser light, UV light, light of any or all other kinds, solar power, human touch or some other external or internal force.

iii) Each of the security devices can be added/incorporated at the article's point of manufacture, or applied by an individual to a single article.

A further aspect in relation to security devices of this application relates to PC's which have CD reading and writing abilities, e.g. which have means which are capable of reading a CD whilst at the same time writing onto it. Accordingly set out below are details of how the types of security device disclosed herein would be adapted to take account of this CD read and write facility.

a) Data Lock Security Device

In this case a PC would have to write onto the CD unique information, such as a fingerprint relayed via a fingerprint recognition device incorporated via a mouse controller.

b) Data Self Destruct Security Device

Here the PC would effectively render the CD useless the first time it reads and consumes its data. Through programming, the CD would be commanded to delete/destroy, or even just never to release again, its data. As before, the data would then be locked into the PC's hard drive and would require a start-up program/key which would be provided from the software vendor's website once registration/verification is submitted.

The invention claimed is:

1. A data information carrying disc intended to be rotatable by drive means of a reader/player, in use, the disc incorporating security disabling means allowing data/information to be read and/or downloaded when the disc is used for the first time, but preventing such reading after said first time, the disc having an enclosure, said enclosure having an irregular surface defining a jagged area, at least part of a readable surface of the disc being arranged to be covered by a transparent gel/liquid counteracting said jagged area by its position adjacent said jagged area in one part of said enclosure so as to allow reading of said readable surface by disc reading means, the first play of the disc, or operation of eject means of the reader/player, in use, causing the transparent gel/liquid at least partially to move from and no longer counteract at least part of said jagged area, so as to prevent the reading of at least part of by said readable surface by said disc reading means.

2. A disc as claimed in claim 1, wherein the gel/liquid is arranged so that said at least partial improvement thereof, in use, at least partially exposes said jagged area to said disc reading means.

3. A disc as claimed in claim 1, wherein said enclosure has said one part over said readable surface part and extends radially outwardly therefrom towards the periphery of the disc.

4. A disc as claimed in claim 1, wherein the gel/liquid is of sufficient viscosity to remain at said one part of the enclosure up to the end of said initial first play of the disc.

5. A disc as claimed in claim 1, wherein at the end of said first play of the disc or on operation of said eject means, the gel/liquid is moved away from the readable surface by centrifugal force.

6. A disc as claimed in claim 5, including software which, at the end of said first play, or upon said eject means being operated, in use, at or before the end of said first play of the disc, causes the disc reading means to act on the gel/liquid to reduce its viscosity, so that play of the disc then causes said movement of the reduced viscosity gel/liquid away from said one part of the enclosure.

7. A disc as claimed in claim 6, wherein operation of the eject means also causes said play of the disc and Which causes said movement of the gel/liquid.

* * * * *